(No Model.)
B. L. WILLIAMSON.
COUPLING FOR SHAFTS, PULLEYS, &c.
No. 384,812. Patented June 19, 1888.
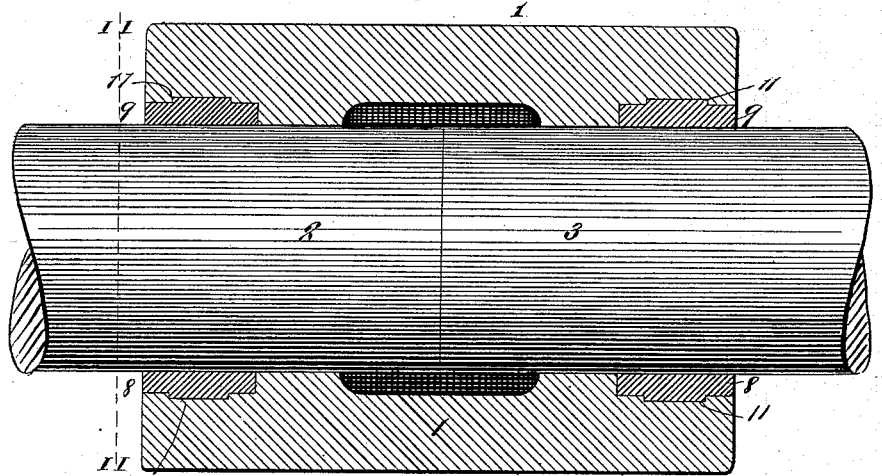
Fig. I.
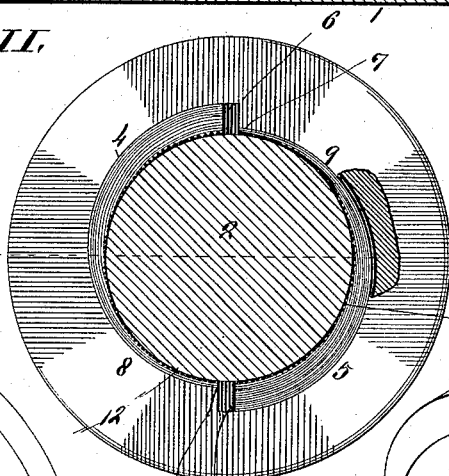
Fig. II.
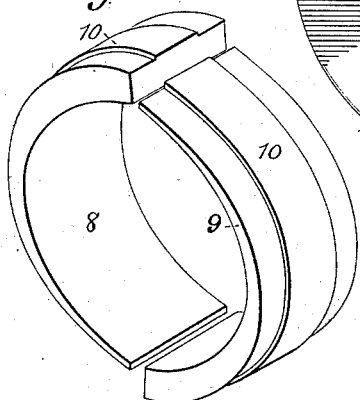
Fig. IV.
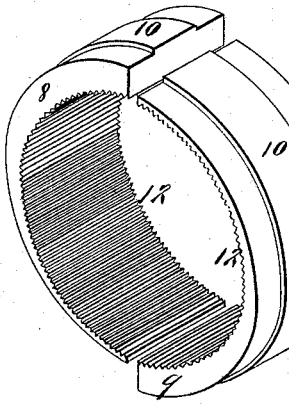
Fig. III.
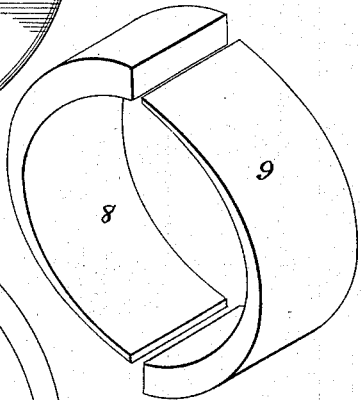
Fig. V.
Attest:
W. E. Knight
E. Arthur
Inventor:
B. L. Williamson.
By Knight Bro
attys.

UNITED STATES PATENT OFFICE.

BENJAMIN L. WILLIAMSON, OF LITTLE ROCK, ARKANSAS.

COUPLING FOR SHAFTS, PULLEYS, &c.

SPECIFICATION forming part of Letters Patent No. 384,812, dated June 19, 1888.

Application filed January 21, 1888. Serial No. 261,517. (No model.)

*To all whom it may concern:*

Be it known that I, BENJAMIN L. WILLIAMSON, of Little Rock, in the county of Pulaski and State of Arkansas, have invented a certain new and useful Improvement in Couplings for Shafts, Pulleys, &c., of which the following is a full, clear, and exact description, reference being had to the accompanying drawings, forming part of this specification, and in which—

Figure I is a side view of my improved coupling, the sleeve being in section to more clearly show the different parts. Fig. II is a section taken on line II II, Fig. I, showing one end of the sleeve and side view of the segmental wedges, a portion of the sleeve being broken away to show the projection on the wedge. Fig. III is a perspective view of the wedges. Fig. IV is a perspective view showing a modification in the form of the wedges, where the serrations are dispensed with. Fig. V is a perspective view showing another modification in the form of the wedges, where the ribs are also dispensed with.

My invention relates to an improved coupling for shafts, pulleys, &c.; and my invention consists in features of novelty, hereinafter fully described, and pointed out in the claims.

Referring to the drawings, 1 represents the coupling-sleeve, which is shown placed over the abutting ends of two sections of shafting, 2 and 3. The interior of the sleeve is provided with two tapering recesses at each end, 4 5, each one of which extends half-way around the sleeve, and are the largest at 6, and gradually diminishing till they reach a point, 7, half-way around the sleeve.

8 and 9 are segmental tapering wedges, which fit in the openings 4 and 5 in the sleeve, two at each end of the sleeve. The wedges after being placed in the sleeve can be tightened up or adjusted by striking against the larger end and driving them to the desired position, and thus a tight joint or close connection is made between the sleeve and shaft.

10 is a rib or projection, which may be placed on the periphery of each wedge, which fits in a groove, 11, in the sleeve, preventing lateral movement of the wedge. The inner surface of the wedges which come in contact with the shaft may be serrated, as shown in Fig. III, or otherwise roughened to keep the wedges tight and preventing their slipping; but smooth wedges may be used, as shown in Fig. IV. The ribs can be dispensed with, as shown in Fig. V.

The serrations or ribs, or both, are desirable, but not essential to my invention.

I have described my invention as a coupling for shafts; but, as may readily be seen, it can be used in various ways, as for fastening pulleys, flanges, gear-wheels, sleeves, and other objects to be secured to a cylindrical surface, and by means of its adjustability objects may be centered without boring, as was heretofore frequently necessary, owing to the parts connected not being exactly round. The invention also avoids key-seats and may be used on turned or rough shafts, and can be easily and quickly applied. The use of these two tapering wedges which meet around the shaft always makes the face of the pulley or coupling run true, and does not throw the face of the pulley away from the center as other forms of couplings do.

By the use of a pair of wedges at each end of the sleeve they (the wedges) can be made quite narrow and are much easier of application than wedges extending entirely through the sleeve would be, and they can likewise be readily tightened, whereas with wedges extending all the way across it is extremely difficult to drive them tight (as the center or middle of them cannot be reached or got at) without one end being driven farther forward than the other. Particularly is this the case when only one end can be reached, owing to one end of the coupling being situated near some other object.

Another advantage of the twin wedges at each end is that they dispense with the necessity of dressing the interior of the sleeve, and no matter how rough it may be it will not affect the action of the wedges in holding the sleeve concentrically on the shaft, as would be the case were the wedges to extend all the way across, when any irregularity between the sleeve and wedges at or near the center of the former would cause a misfit near the ends of the sleeve, and the result would be that the sleeve would not be properly held on the shaft and would not be concentric with the shaft, causing the latter to wabble and to be unevenly balanced, which would be objectionable at any time, and particularly when the shaft is run at a high speed.

I am aware that it is not original with me to use a pair of wedges each wedge being in one piece and extending the length of the coupling, and I do not, therefore, claim such construction.

I claim as my invention—

1. The combination, with the shaft, of the sleeve formed with independent pairs of segmental tapering recesses, one pair at each end, and the pairs of segmental tapering wedges occupying the recesses, substantially as described.

2. The combination, with the shaft, of the sleeve formed with independent pairs of segmental tapering recesses, one pair at each end, and grooves in the recesses, and the segmental tapering wedges occupying the recesses, formed with ribs occupying the grooves, substantially as described.

3. The combination, with the shaft, of the sleeve formed with independent pairs of segmental tapering recesses, one pair at each end, and the pairs of segmental tapering wedges occupying the recesses, having serrated inner surfaces, substantially as described.

4. The combination, with the shaft, of the sleeve formed with independent pairs of segmental tapering recesses, one pair at each end, and grooves in the recesses, and the segmental tapering wedges occupying the recesses, formed with ribs occupying the grooves, and having serrated inner surfaces, substantially as described.

BENJAMIN L. WILLIAMSON.

In presence of—
C. M. WING,
JNO. B. KIRKWOOD.